United States Patent [19]

Kaya et al.

[11] 4,412,136
[45] Oct. 25, 1983

[54] LOAD CONTROL FOR ENERGY CONVERTERS

[75] Inventors: Azmi Kaya, Akron; Marion A. Keyes, Chagrin Falls; Thomas J. Scheib, Chesterland, all of Ohio

[73] Assignee: The Babcock & Wilcox Company, New Orleans, La.

[21] Appl. No.: 330,995

[22] Filed: Dec. 15, 1981

[51] Int. Cl.³ .......................... G06G 7/635; H02J 3/46
[52] U.S. Cl. ..................................... 290/40 R; 307/24; 307/57; 364/493; 364/494
[58] Field of Search .................... 290/40, 40 A–40 F, 290/4 R, 4 C, 4 D; 60/39.2, 39.21, 39.22; 307/24, 44, 57, 59, 84; 364/493, 494

[56] References Cited

U.S. PATENT DOCUMENTS

| | | | |
|---|---|---|---|
| 3,740,572 | 6/1973 | Cohn | 364/493 X |
| 3,872,286 | 3/1975 | Putman | 364/493 X |
| 3,913,829 | 10/1975 | Fink | 364/493 |
| 4,136,286 | 1/1979 | O'Halloran et al. | 307/57 |
| 4,267,571 | 5/1981 | Cohn | 307/57 X |

Primary Examiner—J. V. Truhe
Assistant Examiner—Terry L. Flower
Attorney, Agent, or Firm—John F. Luhrs; Vytas R. Matas; Robert J. Edwards

[57] ABSTRACT

A load control for a system comprised of a plurality of energy converters wherein the energy output of all converters is adjusted in parallel to maintain the total rate of energy output from the system equal to demand and wherein during steady-state conditions the rate of energy conversion for that converter having the lowest incremental cost is increased and simultaneously the rate of energy conversion for that converter having the highest incremental cost is decreased a like amount.

5 Claims, 2 Drawing Figures

LOAD CONTROL FOR ENERGY CONVERTERS

This invention relates to automatic load control of a system comprised of a plurality of energy converters, such as, but not limited to, vapor generators, turbines, blowers, chillers, fans, compressors, heat exchangers. More particularly this invention relates to a load control which distributes the system load among the converters in the system so that the energy conversion is produced at least cost.

The load control herein described has two main objectives. First, to maintain the energy output of the converters equal to demand and, second, to produce the energy conversion at least cost. The first objective is obtained by establishing an error signal proportional to the difference between actual and required energy output and from this error signal generating a System Control Signal which operates to adjust the energy output of all converters in parallel to maintain the total rate of energy output from the system equal to demand.

In accordance with accepted theory the rate of energy conversion required to satisfy a given demand is produced most efficiently when all converters in the system are converting energy at the same incremental cost. We achieve this, our second objective by, under steady-state conditions, increasing the rate of energy conversion for that converter having the lowest incremental cost and simultaneously decreasing, by a like amount the rate of energy conversion of the energy converter having the highest incremental cost.

A primary objective of our invention is therefore to provide a load control wherein, generally, each of the energy converters immediately share in system load changes in proportion to its capability, but wherein the system load among the converters is then readjusted, under steady-state conditions, so that all converters operate at the same incremental cost.

A further objective of our invention is to provide a load control wherein the readjustment to equalize the incremental cost of the converters is accomplished by making an increase in the output of the converter having the lowest incremental cost and a decrease of like amount in the output of the converter having the highest incremental cost to thereby minimize the disturbance to the system caused by the readjustment.

Still another objective of our invention is to provide a load control wherein the changes are of decreasing magnitude as the incremental cost of the converters approach equality to thereby further reduce the disturbance to the system caused by the readjustment.

Still another objective of this invention is to provide such a control comprised entirely of simple discrete logic components to the end that the cost is materially less and the reliability materially greater than controls utilizing computers with high level software.

These and other objectives will be apparent as the description proceeds in connection with the drawings in which:

IN THE DRAWINGS

DETAILED DESCRIPTION

Figure 1:
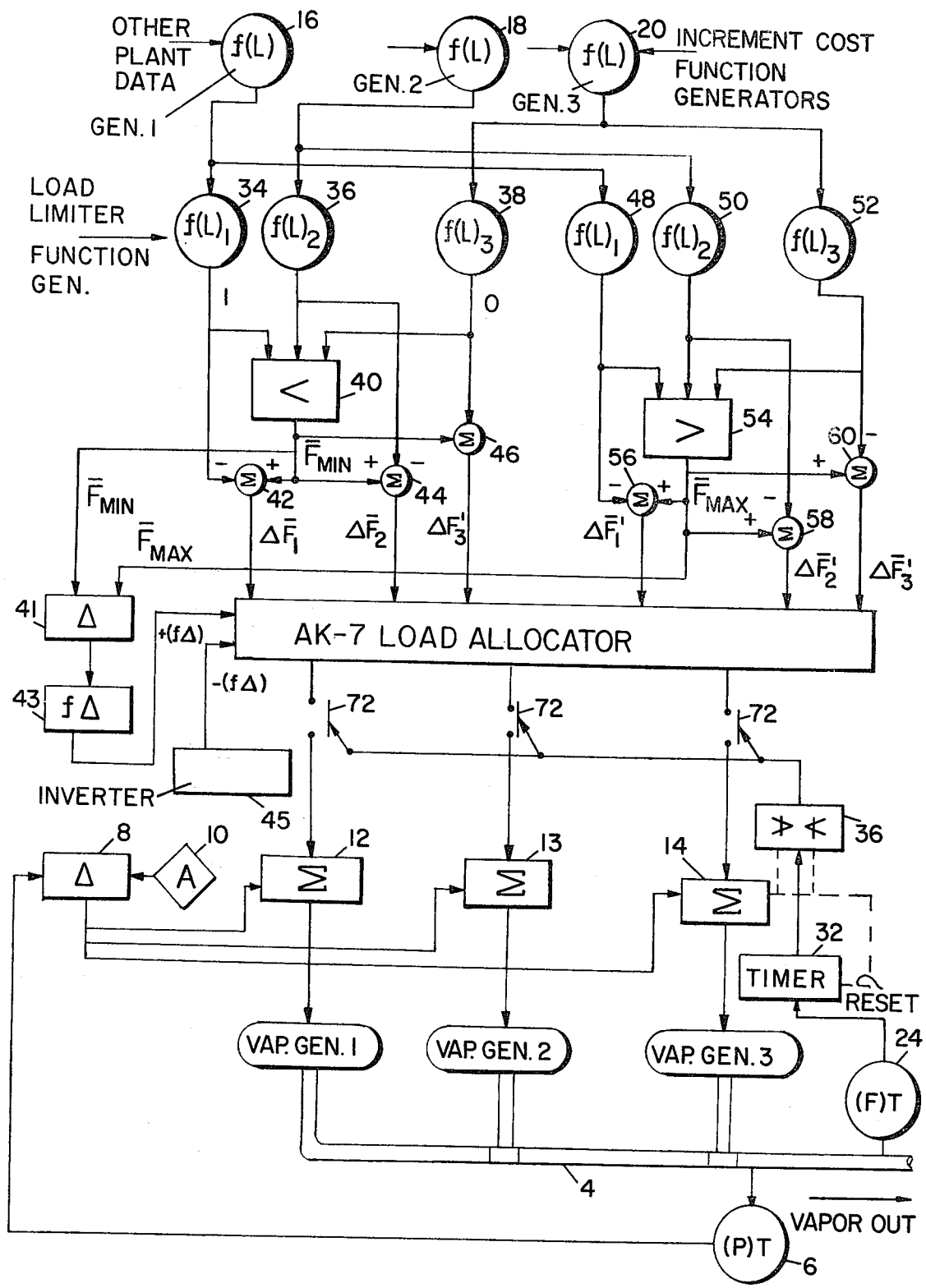
FIG. 1 is a logic diagram of a control embodying the principles of this invention.

In the drawing there is shown vapor generators 1, 2, and 3 supplying vapor to a header 4. A pressure transducer 6, responsive to the pressure in header 4, generates an output signal, varying in proportion to changes in pressure which is transmitted to a difference unit 8 where it is compared to a set-point signal, proportional to the desired vapor pressure, generated in a signal generator 10 producing a System Control Signal proportional to the difference or error between desired and actual vapor pressure.

The System Control Signal is transmitted directly through summing units 12, 13, and 14 to the combustion controls (not shown) for vapor generators 1, 2, and 3 to provide an immediate response to changes in system load.

To provide for the simultaneous readjustment of the firing rate during steady-state conditions of the same amounts, in opposite directions, of the vapor generator having the highest incremental cost and the lowest incremental cost, for each generator a signal corresponding to the incremental cost of vapor generation in generators 1, 2, and 3, there are provided function generators 16, 18, and 20 primarily responsive to a signal (not shown) proportional to generator load such as rate of vapor flow from the generator. To provide for changes in relative fuel costs, generator efficiencies and the like, there may be introduced into the function generators a signal, defined as "other plant data", corresponding to the magnitude of and changes in modification of the output signals of the function generators.

The output signals of function generators 16, 18, and 20 are transmitted to function generators 34,48; 36,50; 38,52; respectively. Within the normal range of operation these function generators pass the output signals without modification to low select unit 40 and a high select unit 54, however as a vapor generator approaches maximum rating, notwithstanding it is producing vapor at minimum incremental cost, an output signal from function generators 34, 36, 38 is produced indicative of a high incremental cost thus preventing a further increase in vapor generation. Conversely, as a generator approaches minimum rating, notwithstanding that it is producing vapor at maximum incremental cost an output signal from function generator 48, 50, or 52 is produced indicative of a low incremental cost thus preventing a further decrease in the rate of vapor generation.

The output signal from low select unit 40 is transmitted to difference units 42, 44, and 46 there will thus be produced an output signal of (0) from one of the difference units and an output signal other than (0) from the remaining difference units all of which signals pass to a Load Allocator AK-7 which will be described in detail later. The output signal from low select unit 40 is transmitted to a difference unit 41.

The output signal from select unit 54, the output signal of which identifies the vapor generator producing vapor at highest incremental cost. Difference units 56, 58, 60 transmit one signal of (0) and signals other than (0) to the Load Allocator AK-7. The output signal from low select unit 54 is transmitted to the difference unit 41.

The output signal from difference unit 41, in magnitude proportional to the difference in incremental costs between the vapor generator having the lowest and highest incremental cost is transmitted to a function generator producing an output signal varying in non-linear relationship to the input signal such as, but not limited to $X^2$ where X is the magnitude of the input signal. Two signals of equal magnitude but of opposite polarity are derived by means of an inverter 45 are derived from the output signal of function generator 43 and transmitted to the AK-7 Allocator.

Figure 2:
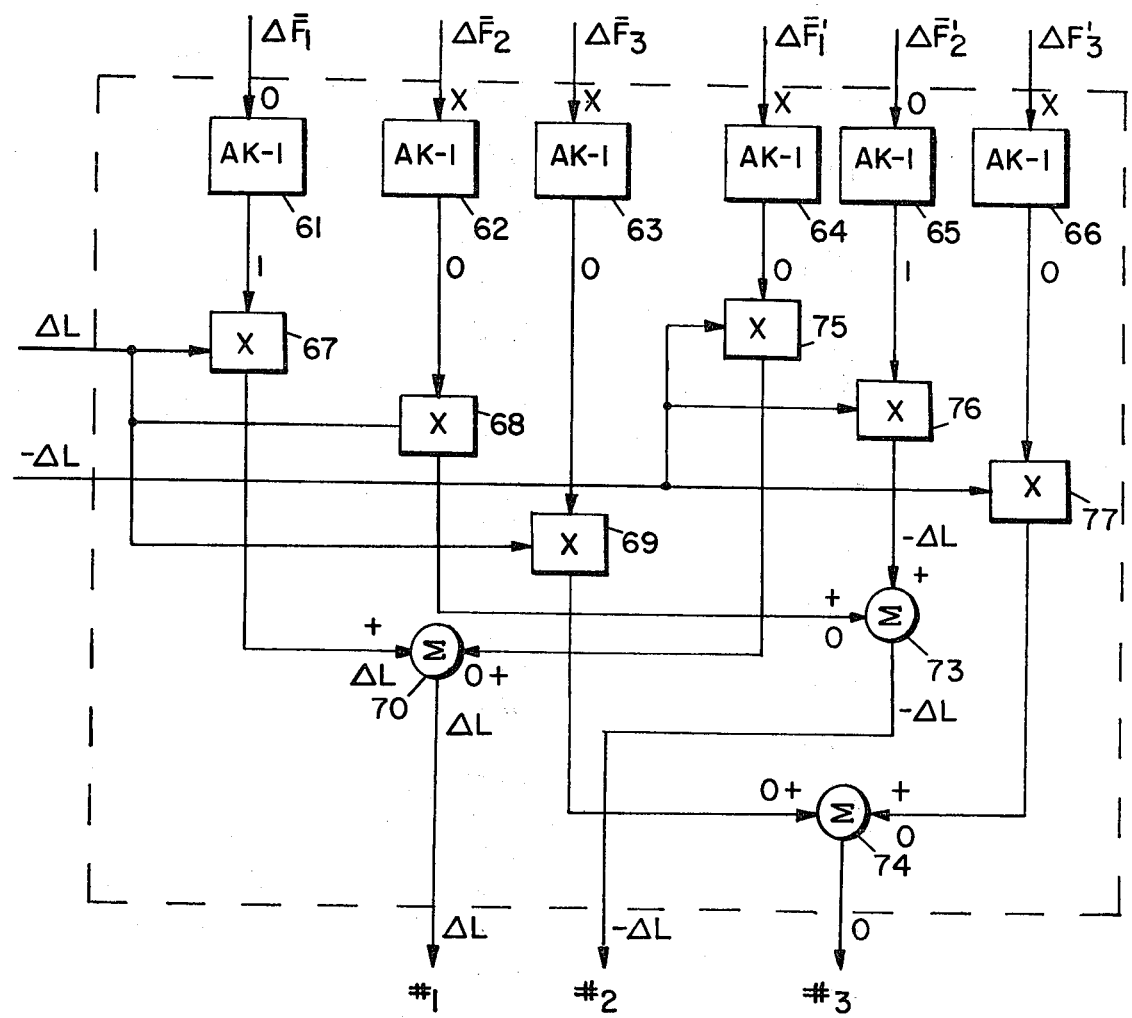
FIG. 2 is a detailed logic diagram of the Load Allocator shown in block form in FIG. 1.

Referring now to FIG. 2, the output signals from difference units are transmitted to control action units 61-66 which produce an output signal of (1) when the input signal is (0) and an input signal other than (0) produces an output signal of (0) thus identifying the generators having the lowest and highest incremental costs.

The output signals from control action units 61, 62 and 63, one of which will have a value of (1) representing the vapor generator having the lowest incremental cost, are transmitted to multiplying units 67, 68, 69 for multiplication by the output signal transmitted directly from function generator 43. The output signal from multiplying unit 67 is transmitted to a summing unit 70, the output signal from multiplying unit 68 is transmitted to a summing unit 73 and the output signal from multiplying unit 69 is transmitted to a summing unit 74. As evident only that signal will pass through a multiplying unit 67, 68, 69 having an input signal of (1) for transmission through an enable switch 72 to increase the firing rate of that generator having the lowest incremental cost.

Referring again to FIG. 2, the output signals from control action units 64, 65, 66, one of which will have a value of (1) representing the vapor generator having the highest incremental cost are transmitted to multiplying units for multiplication by the output signal for inverter 45. The output signal from multiplying unit 75 is transmitted to summing unit 70, the output signal from multiplying unit 76 is transmitted to summing unit 73 and the output signal from multiplying unit 77 is transmitted to summing unit 74. As evident only that signal will pass through a multiplying unit 75, 76, 77 having an input signal of (1) for transition through an enable switch 72 to decrease the firing rate of that generator having the highest incremental cost. The increase in firing rate of that generator having the lowest incremental cost will be equal to the decrease in firing rate of that generator having the highest incremental cost.

It is recognized that the readjustment of generator loads to equalize their incremental costs should be done only under steady-state conditions, when, for a predetermined period of time, the total rate of vapor generation remains substantially constant. To assure that the readjustment is only made under such steady-state conditions, there is shown a timer 32, into which is introduced, at the start of the timing period, the output signal from a steam flow transducer 24 wherein it remains constant and subtracted from the current output signal to produce an output signal proportional to the difference. So long as the output signal remains within the limits established by a high-low limiter the output signal from timer 32 activates enable switch 72 allowing the readjustment to proceed. If however the output signal from timer 32 is greater or less than that established by the high-low limiter 36, switch 72 opens thereby deactivating the readjustment and simultaneously sending a reset signal to timer 32 to indicate a new timing period.

We claim:

1. A load control for a system comprised of a plurality of energy converters, comprising, a first means generating a System Control Signal corresponding to the system load, a second means adjusting in parallel the energy output of each of said converters in accordance with changes in the System Control Signal, means producing an individual incremental cost signal for each of said plurality of converters, means responsive to said last named signals generating (a) a signal corresponding to the difference between the highest and lowest incremental cost, and (b) a signal identifying the generator having said lowest incremental cost and said highest incremental cost and means under the control of signals (a) and (b) increasing the energy output of the converter having the lowest incremental cost and simultaneously decreasing by a like amount the energy output of the converter having the highest incremental cost.

2. A control system as set forth in claim 1 further including means inhibiting changes in the energy output of all other converters the incremental costs of which are less than said highest incremental cost and greater than said lowest incremental cost.

3. A control system as set forth in claim 2 further including timing means inhibiting the adjustment of the energy outputs of the generators having the highest and lowest incremental costs by signals (a) and (b) unless the total output of said plurality of generators remains within predetermined limits for a predetermined period of time established by said timing means.

4. A control system as set forth in claim 1 further including means modifying said signal (a) in a non-linear functional relation to the difference between the highest and lowest incremental costs.

5. A load control as set forth in claim 1 wherein said energy converters are vapor generators.

* * * * *